United States Patent [19]

Nakai et al.

[11] Patent Number: 4,974,693
[45] Date of Patent: Dec. 4, 1990

[54] POWERED THREE WHEELED GOLF CART

[75] Inventors: Masao Nakai; Yoshihiko Imazu, both of Iwata, Japan

[73] Assignee: Yamaha Hatsudoki Kabushiki Kaisha, Iwata, Japan

[21] Appl. No.: 362,825

[22] Filed: Jun. 7, 1989

[30] Foreign Application Priority Data

Jun. 9, 1988 [JP] Japan .................. 63-142611

[51] Int. Cl.⁵ .................. B62D 51/04; B62D 61/08
[52] U.S. Cl. .................. 180/19.3; 180/2.5; 280/DIG. 5; 74/689
[58] Field of Search .................. 280/DIG. 5; 180/19.1, 180/19.3, 215, 217, 357, 366, 373; 474/12, 13, 17, 69; 74/689

[56] References Cited

U.S. PATENT DOCUMENTS

| | | | |
|---|---|---|---|
| 3,896,893 | 7/1975 | Willis | 180/19.1 |
| 4,429,758 | 2/1984 | Meshulam | 180/19.3 |
| 4,570,732 | 2/1986 | Craven | 280/DIG. 5 X |
| 4,706,518 | 11/1987 | Moroto et al. | 74/689 |
| 4,744,432 | 5/1988 | Shibata et al. | 180/215 X |

Primary Examiner—Charles A. Marmor
Assistant Examiner—Mitchell Bompey
Attorney, Agent, or Firm—Ernest A. Beutler

[57] ABSTRACT

A compact three wheeled golf cart that is powered by an internal combustion engine that is disposed within a triangle defined by the contact patch of the wheels with the ground to provide stability. The cart is steered by an operator who walks along adjacent the cart and does not ride upon it. An improved variable speed belt transmission and combined reduction set and differential drive the wheels of the cart from the engine.

14 Claims, 5 Drawing Sheets

POWERED THREE WHEELED GOLF CART

BACKGROUND OF THE INVENTION

This invention relates to the a powered three wheeled golf cart and more particularly to an improved, compact arrangement for such a cart and also to an improved driving arrangement for a cart of this type.

There are a variety of types of golf carts which can be utilized. The use of a powered cart has obvious advantages. However, powered carts in which the user rides in the cart are very bulky, expensive and have limited utility for most individuals. Therefore, it has been proposed to provide a smaller type of powered cart wherein the operator does not ride on the cart but merely walks beside its. However, the cart provides sufficient area to carry a number of golf bags and various golfing paraphernalia. In accordance with its compact nature, it is desirable to provide only three wheels for such carts so that the operator can easily steer the cart without the necessity of using a steering wheel.

In connection with said vehicles and particularly those only having three wheels, there are obvious concerns as to stability. That is, it is desirable so as to locate the major components of the vehicles so that the vehicle will be extremely stable. This has been very difficult to achieve with carts of this type in the past due to the layout of components.

It is, therefore, a principal object of this invention to provide an improved, compact and yet highly stable three wheeled golf cart.

It is a further object of this invention to provide a three wheeled golf cart that is designed to be operated by an operator walking adjacent the cart and which will have a high degree of stability.

In addition to the problems aforenoted, where the cart is provided with an internal combustion engine, some cooling system must be provided for the engine. It is, of course, desirable that the cart have a neat and compact appearance and this involves the use of providing exterior sheet metal so as to achieve this purpose. However, this is somewhat inconsistent with the cooling requirements.

It is, therefore, a further object of this invention to provide an improved compact three wheeled golf cart wherein the engine can be positioned in an area to achieve good stability and yet will be adequately cooled.

As a further problem in connection with this type of vehicle, the cart should be provided with a transmission system which will insure that the cart will continue to travel at the desired speed regardless of the terrain over which the vehicle is operated. That is, the operator should be able to preset a speed through a simple control and the vehicle should maintain this speed over all terrains. This can be achieved through the use of varying types of transmissions, however, those previously proposed for this purpose have been large, cumbersome and have prevented the use of the stable construction as desired.

It is, therefore, a still further object of the this invention to provide an improved transmission arrangement for a three wheeled golf cart.

SUMMARY OF THE INVENTION

A first feature of this invention is adapted to be embodied in a powered cart comprising a frame assembly, a dirigible wheel assembly journaled at a forward portion of the frame assembly for steering of the cart and a pair of rear wheels journaled at opposite sides of the rear of the frame assembly. The point of contact of the front and rear wheels with the ground defines generally a triangle in the plane of the ground. An engine is carried by the frame. Means are provided for driving the rear wheels from the engine and means are carried by the frame means for controlling the cart by an operator standing adjacent the cart. In accordance with this feature of the invention, the engine lies within an area bounded by the triangle.

Another feature of this invention is adapted to be embodied in a powered cart of the type as aforedescribed. In accordance with this feature of the invention, the engine is at least partially enclosed within a metal cowling and the cowling is provided with air inlet and air outlet openings on opposite sides of the vehicle for transverse cooling air flow across the vehicle and the engine.

A further feature of this invention is adapted to be embodied in a transmission for a cart of the type as aforedescribed. In accordance with this feature of the invention, there is provided a final drive having a differential mechanism and a two stage planetary transmission for providing a speed reduction.

A further feature of the invention is adapted to be embodied in a drive arrangement of the type as aforedescribed that incorporates a variable belt transmission that includes a centrifugal arrangement for providing a varying speed ratio in response to input shaft speed and also a varying ratio mechanism that adjusts the speed ratio in response to the speed of the output shaft with this latter transmission being effective to override the first mentioned transmission speed control.

DETAILED DESCRIPTION OF THE PREFERRED EMBODIMENT OF THE INVENTION

Figure 1:
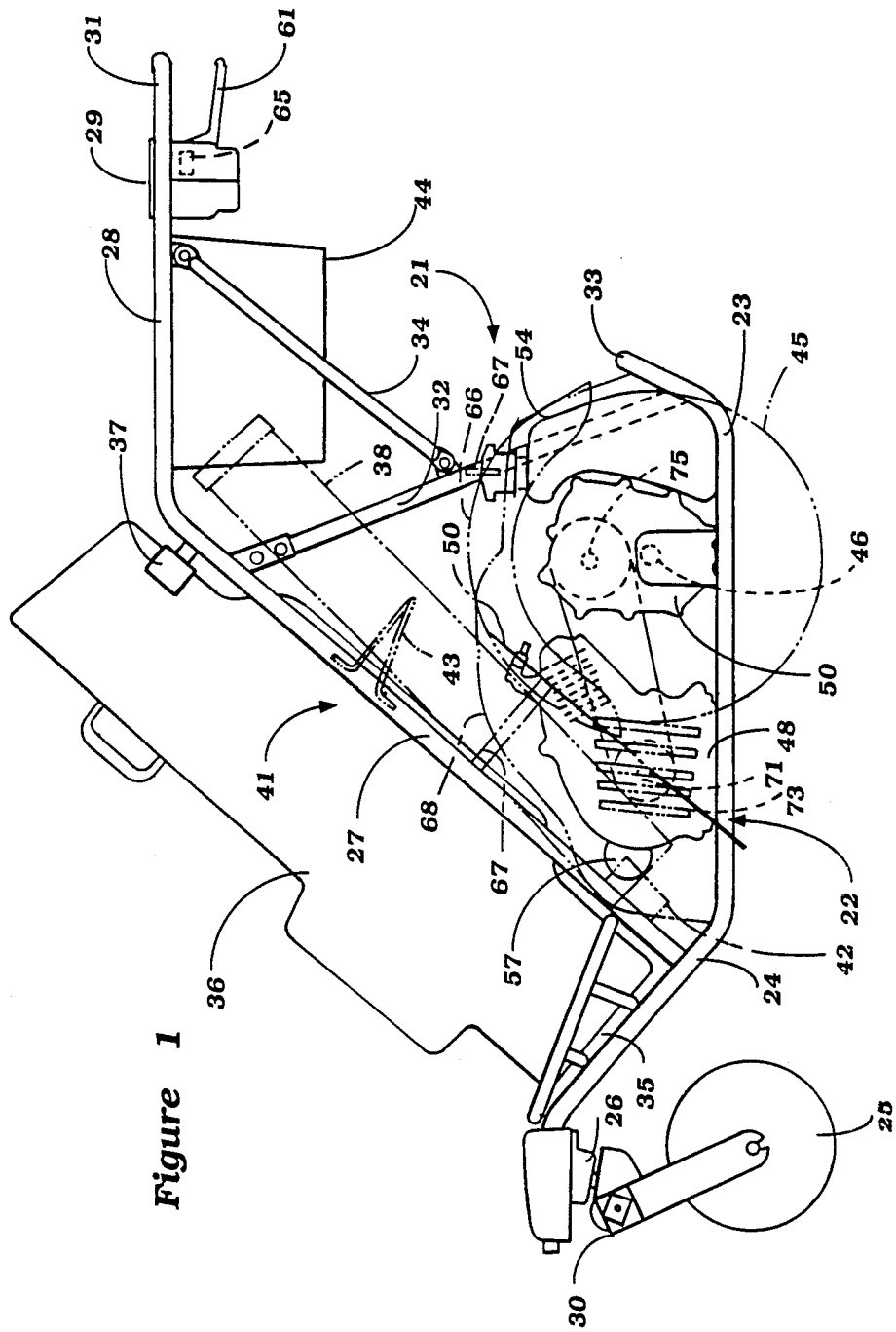
FIG. 1 is a side elevational view of a golf cart constructed in accordance with an embodiment to the invention.
Figure 2:
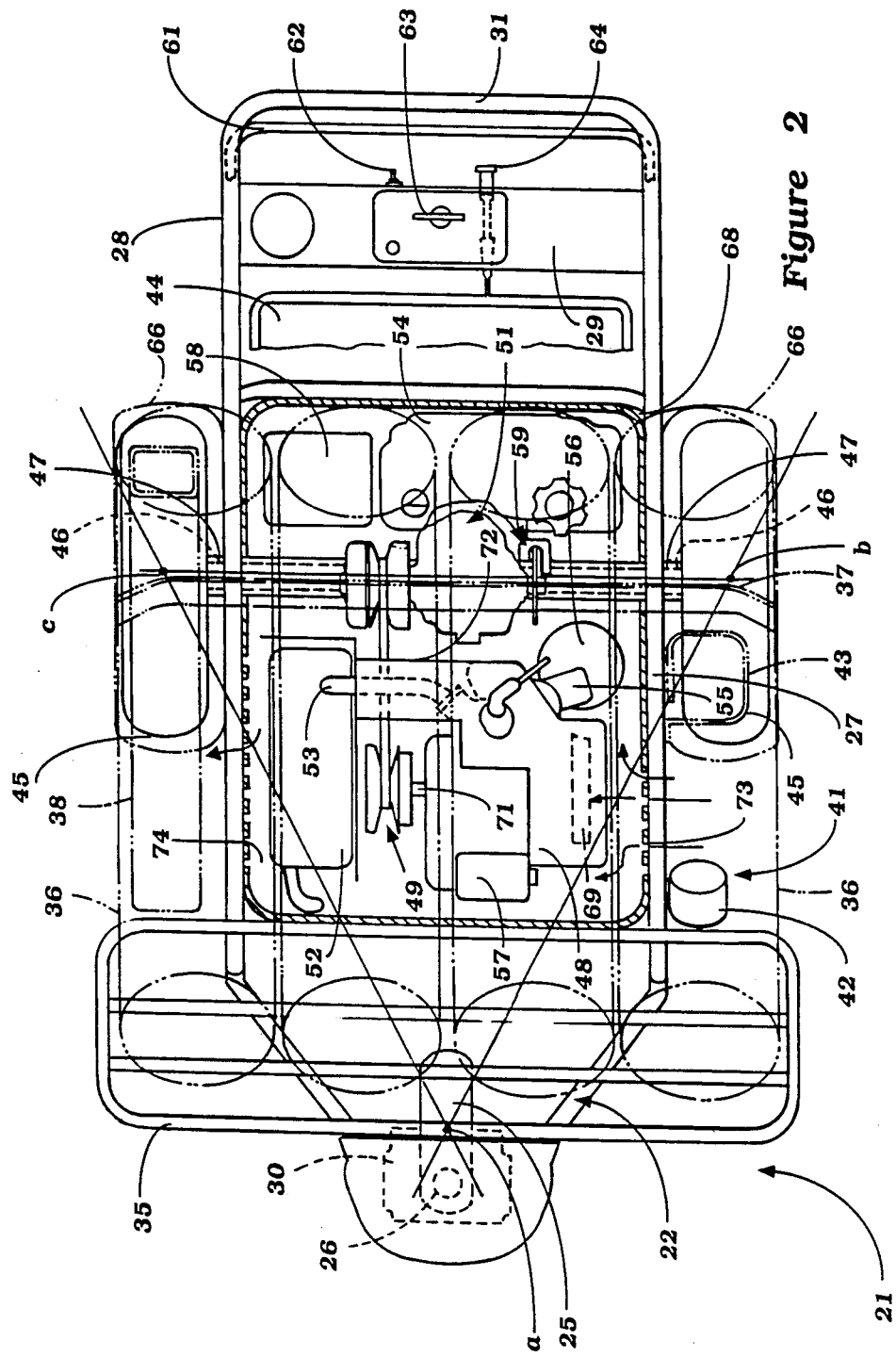
FIG. 2 is a top plan view of the golf cart.
Figure 3:
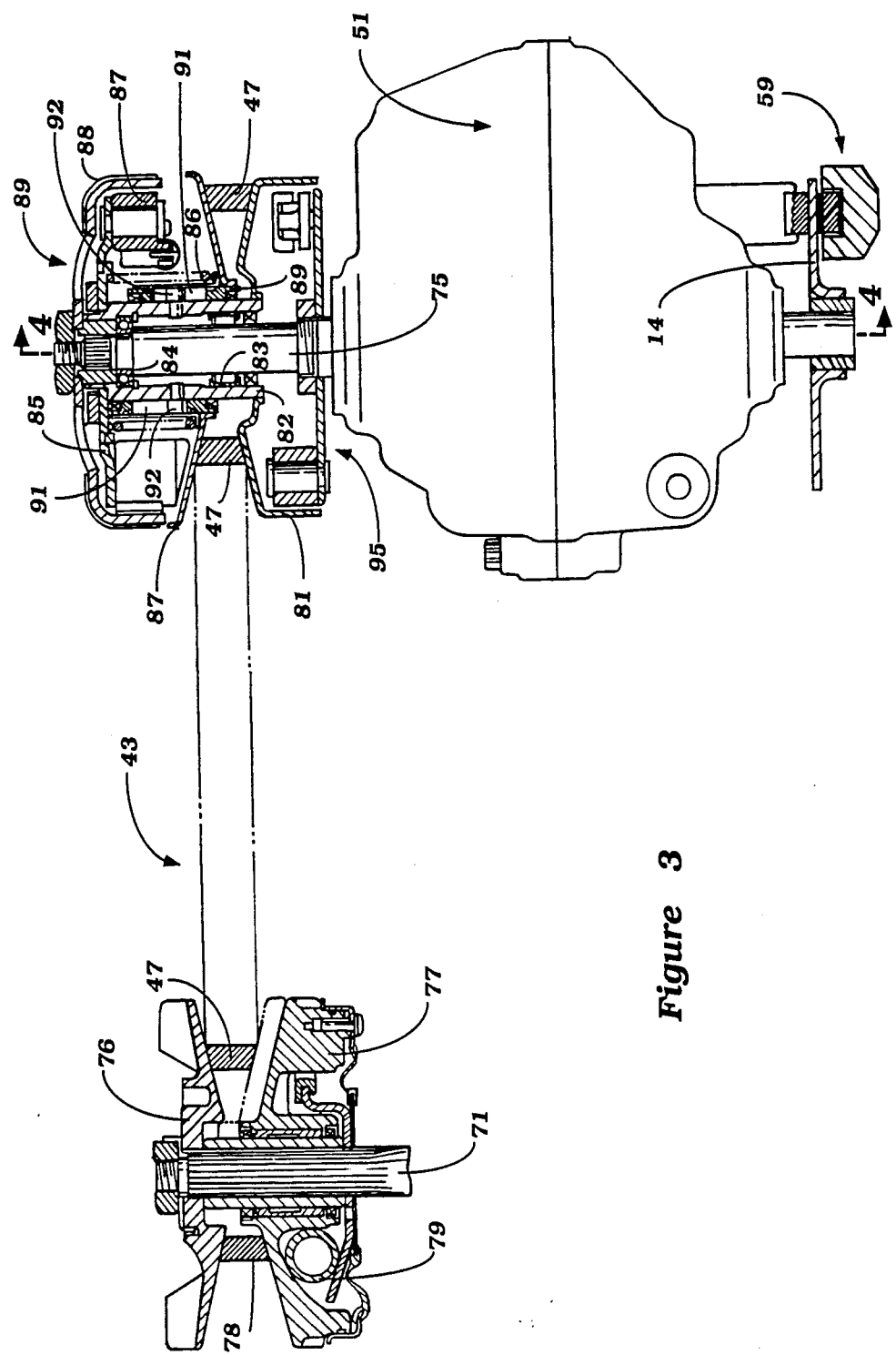
FIG. 3 is a top plan view of the transmission and brake assembly with portions shown in section.

Referring first to FIGS. 1 and 2, a small powered golf cart constructed in accordance with an embodiment of the invention is identified generally by the reference number 21. The golf cart 21 is of the type that is designed to be operated by an operator walking behind or to the side of the cart 21 and not riding upon it. As a result, it is important that the controls for the golf cart 21 will be under full operator control at all times and yet that this control be relatively simple.

The golf cart 21 is comprised of a frame assembly, indicated generally by the reference number 22 and which is of the welded up type that includes a generally basic configuration made up of interconnected welded tubular members comprised of a lower portion 23 that has a generally open rectangular shape and which has an upwardly inclined forward part 24 that is configured more in a triangular configuration and which carries a front wheel 25 or front wheel assemblage by means of a caster assembly 26 and damper mechanism 30 so that the cart 21 may be steered.

The steering of the cart 21 is accomplished by means of a generally rectangular steering frame assembly 27 that extends diagonally upwardly from the point where the triangular portion 24 joins the rectangular portion 23 and which then extends rearwardly to form a generally horizontally extending rectangular portion 28 that carries a control panel assembly 29 and which has a handle bar portion 31 by which the operator may steer the cart by applying appropriate pressure.

The frame further includes a pair of reinforcing struts 32 that extend diagonally upwardly from an upwardly curved rear portion 33 of the frame part 23 and are joined at the upper end of the diagonal portion 27. Cross braces 34 extend between the portion 32 and the portions 28 for further reinforcing and stability.

A golf bag rest 35 is affixed to the frame portions 24 and 27 and is designed so as to accommodate a plurality of golf bags 36 disposed in a side by side relationship. The upper ends of the golf bags 36 are supported by means of support bar 37 that is affixed to the upper end of the frame portion 27 adjacent to the point where the braces 32 are connected to.

At one side of the frame assembly 22 there is provided a putter case 38 that is supported by the frame assembly. The putter case 38 is designed so as to hold one or more putters or other clubs.

At the opposite side of the cart, there is provided an umbrella or other type of receptacle, indicated generally by the reference numeral 41 which includes a lower receptacle 42 and an upper supporting bracket 43 that is adapted to receive articles such as umbrellas or the like.

There is further provided a basket type receptacle 44 that extends across and is suspended from the steering handle portion 28 for receiving a variety of articles such as balls, tees, scorecards and the like.

A pair of rear wheels 45 are affixed for rotation with rear axle shaft 46 which are, in turn, journaled within axle tubes 47 that are carried by the frame 22 by brackets 50. The rear wheels 45 are driven by means of an internal combustion engine 48 that is supported within the perimeter of the frame 22 and specifically the portion 23. It should be noted that the mass of engine 48 is disposed within a triangle defined by the point of contact (a) of the front wheel 25 and (b&c) of the rear wheels 45 with the ground so as to insure good stability. The engine 48 drives the rear wheels 45 in a manner to be described. Generally this drive includes a belt type variable transmission 49 which drives the rear axles 46 through a combined step down transmission and differential assembly 51.

In addition to the provision of the driving engine 48 and its positioning within the aforenoted triangle, a number of accessories of the engine are also carried by the frame assembly 22 in such a way so as to improve the stability of the vehicle. This includes a muffler or exhaust system 52 that receives the exhaust gases from the engine 48 through an exhaust pipe 53, silences them and discharges them to the atmosphere.

The engine 48 is also provided with a fuel system that includes fuel tank 54 and carburetor 55 to which the fuel from the tank 54 is delivered in a suitable manner. An air cleaner assembly 56 delivers filtered and silenced air to the carburetor 55.

The engine 48 is also provided with an electric starter 57 that is powered by a battery 58.

There is further provided a disk type brake assembly 59, of a construction to be described in more detail and which operates on an intermediate shaft of the step down transmission differential assembly 51 for stopping the vehicle. This brake is controlled by means of a pivotally supported brake control operator 61 that is supported at opposite sides of the steering handle portion 28 in a suitable manner and which is connected by means of a linkage system (not shown) to the disk brake 59 in any known manner for operating it.

In addition to these components, the control panel 29 supports a main switch 62 for energizing the electrical circuit, a speed control lever 63 that controls the speed of the engine through a suitable linkage and governor mechanism and a choke control 64 that is connected to a choke valve of the carburetor in a known manner.

The brake control lever 61 has associated with it a condition indicator switch 64 which is operative through a circuit of the type described in the co-pending application entitled "Powered Golf Cart", Ser. No. 07/362,862, filed 6/7/89, in the name of Mitsuo Fukaya, and assigned to the Assignee of this application. Basically, the operation is such that when the brake control lever 61 is released the switch 65 will be closed so as to energize the starter 57 if the engine is not running and so as to start it. The disclosure of that co-pending application is incorporated herein by reference.

The cart 21 is provided with a partial body assembly including a pair of rear fenders 66 that are supported from the frame assembly 22 by means of brackets 67 and which overlie the rear wheels 45. In addition, there is provided a cover assembly 68 that overlies the engine 48, belt transmission 49 and final drive 51 so as to protect it from foreign material and dirt. The cover 68 also serves to reduce the emission of noise from the running components of the cart 21.

In order to permit a compact assembly, it will be noted that the cylinder block of the engine 48 extends at an angle substantially the same as the angle of the frame member 27 as shown by the phantom line 50 in FIG. 1 so as to permit the mass of the engine 48 to be concentrated within the aforedescribed triangle while, at the same time, permitting a short wheel base and compact configuration.

The engine 48 is air cooled and to this end there is provided a fan 69 that is affixed to the output shaft 71 of the engine at the opposite side from the belt transmission 49. The fan 69 operates within a fan cowling 72 that has inlet openings 73 at one side of the cart 21 and outlet openings 74 at the opposite side thereof. As a result, cooling air can easily flow across the engine from one side of the cart 21 to the other so as to insure good and adequate cooling. This is achieved without adding to the volume of the cart 21 or without otherwise interfering with its appearance.

The construction and operation of the transmission will now be described in detail by particular reference to FIGS. 3 through 6. Referring first to the variable speed belt drive transmission 49, this transmission is designed so as to provide a speed ratio between the engine output shaft 71 an input shaft 75 of the final drive 51 that decreases in ratio as the speed of the engine output shaft 71 increases. That is, as the engine is operating more slowly, the output shaft 75 will be driven at a slower relative speed and as the speed of the engine output shaft 71 increases, the speed of the final drive input shaft 75 will increase in ratio. In addition, there is provided a mechanism which will override the speed responsive mechanism and which will provide a lower speed ratio and greater torque when obstacles are encountered by the rear wheels 45 and the driving load increases.

Referring first to the pulley mechanism associated with the engine output shaft 71, this includes a first pulley sheave half 76 that is fixed to the engine output shaft 71 and is axially affixed relative to it. There is further provided an axially moveable pulley sheave half 77 with a drive belt 78 being captured between the pulley sheave halves 76 and 77. The moveable pulley sheave half 77 has an inclined surface that is engaged by an inertial member 79 that moves radially outwardly as the engine output shaft 71 increases so as to force the pulley sheave half 77 toward the sheave half 76 and cause the belt 78 to move outwardly therebetween.

The input shaft 75 of the final drive 51 above the driven rear axle 46 as shown in FIG. 1 and includes a fixed pulley sheave half 81 that is axially fixed to the shaft 75 but which is rotatably journaled upon it in a manner to be described. The fixed sleeve sheave half 81 is, in turn, affixed to one end of a sleeve 82 which is journaled on the shaft 75 by spaced bearings 83 and 84. Also affixed to this sleeve 82 is a plate 85. A coil compression spring 86 is compressed between the plate 85 and a moveable pulley sheave half 87. The spring 86 will normally compress when the effective diameter of the pulley assembly associated with the engine output shaft 71 increases so that this effective diameter will decrease. Drive is transmitted from these pulley sheave halves 81 and 87 to the shaft 55 by means of a centrifugal clutch assembly 89 that is comprised of centrifugal weights 87 that cooperate with a drum 88 for driving the input shaft 75 when the rotational speed is high enough.

Figure 6:
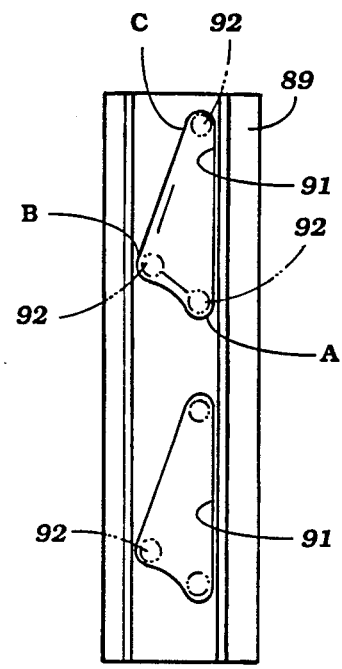
FIG. 6 is a developed view showing the operation of the load responsive transmission ratio control.

It should be noted that the pulley sheave half 87 is also affixed to a sleeve 89 and a pin and cam arrangement is incorporated between the sleeve 82 and the sleeve 89 for effecting axial movement of the pulley sheave half 87 relative to the sleeve 82 in response to changes in the load on the rear wheels. This cam mechanism may be best understood by reference to FIGS. 5 and 6. It will be seen in these figures that the sleeve 89 is provided with a cam shaped opening 91 that is configured as best seen in FIG. 6 which figures is a developed view of the construction. A pin 92 is affixed to the sleeve 82 and is received in this groove 91 so as to transmit rotary motion between these sleeves and also so as to effect relative axial movement between them. Basically, the operation is such that when driving at high speed and under low loads, the pin 92 will be positioned in the portion of the groove indicated by the point B so that the aforedescribed high speed operation is possible. However, as the load on the drive increases, the pin 92 will slide along the cam groove 91 to the point A so as to cause the speed ratio of the pulley to decrease and cause a higher driving torque. Also, under extreme decelerations, the pin 92 will move to the position C and also cause a reduced speed ratio that will improve engine braking.

It should also be noted that there is provided a centrifugal clutch 95 that operates between the shaft 75 and the pulley sheave 81 so as to insure that the pulley mechanism is coupled to the input shaft 75 of the final drive 51 on deceleration so as to achieve engine braking. It should be noted under this condition that the centrifugal clutch 89 may disengage under this condition since the speed at which the pulley mechanism is driven by the engine will be reduced.

Figure 4:
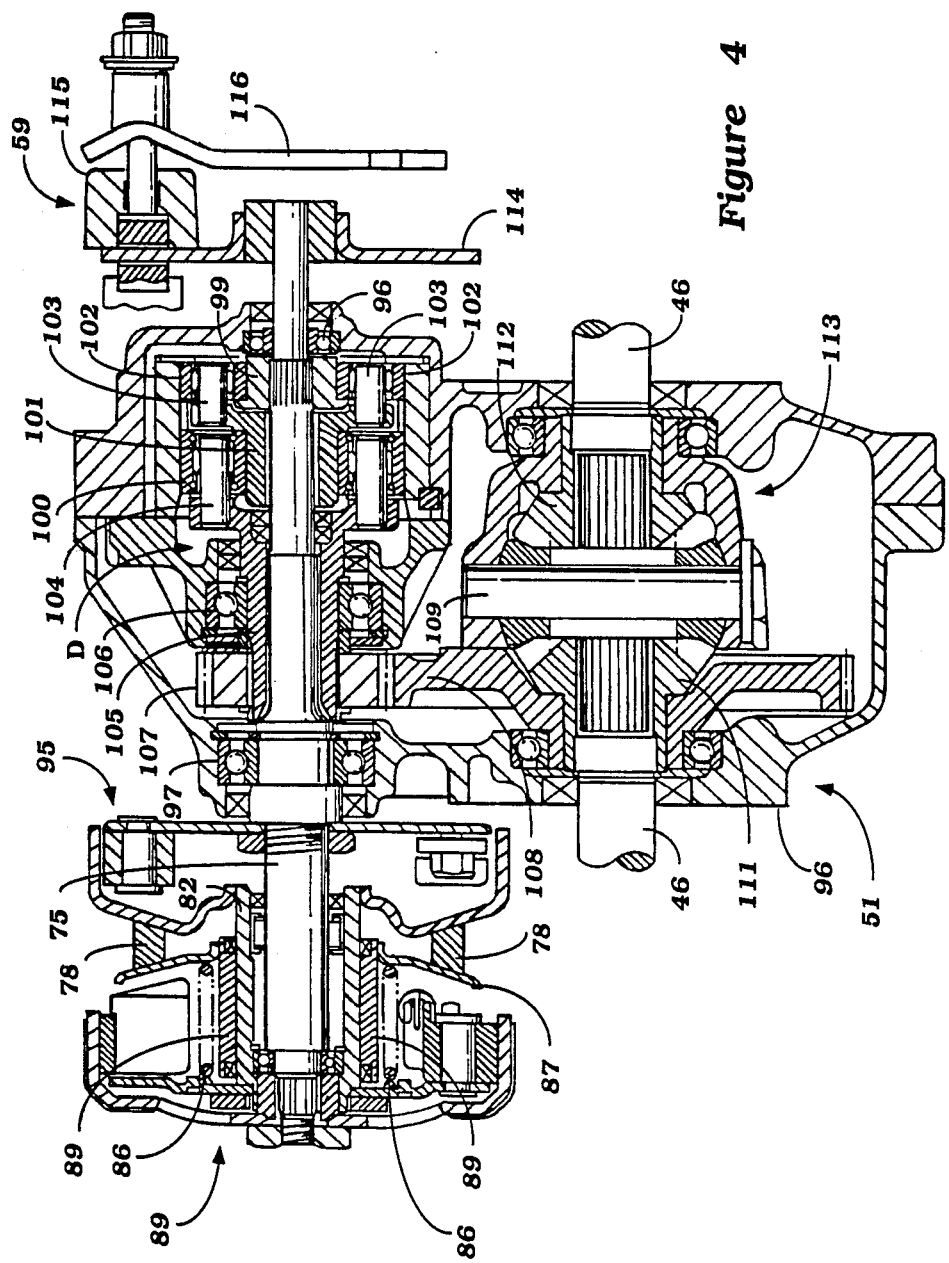
FIG. 4 is a further enlarged cross-sectional view taken along the lines 4—4 of FIG. 3.
Figure 5:
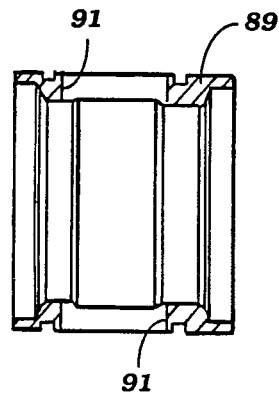
FIG. 5 is a cross-sectional view taken through a portion of the driven part of the belt drive transmission.

Referring primarily in detail to FIG. 4, the construction of the final drive 51 will be described. It will be noted that there is provided an outer housing assembly 96 in which the shaft 75 is supported by means of a pair of transversely spaced apart bearings 97 and 98. The wide spacing of the bearings gives a strong construction. Adjacent the bearing 98, there is splined to the shaft 75, a frictional, roller type sun gear 99 of a first planetary gear set which includes a carrier 101 that carries a plurality of frictional, roller type planet gears 102 on respective pin shafts 103. The carrier 101, in turn, is formed with a frictional, roller type sun gear that is in mesh with frictional, roller type planet gears 160 carried on pin shafts 104 of a second carrier member 105. This carrier 105 is journaled in an intermediate bearing 106 and has a spur gear 107 affixed to one end of it. The spur gear 107 engages a further gear 108 to provide an additional gear reduction. The spur gear 108 drives a spider gear assembly 109 that cooperates with a pair of bevel gears 111 and 112 that are coupled to the respective axle shafts 46 so as to provide a differential assembly, indicated generally by the reference numeral 113.

As has been noted, the disc brake assembly 59 is associated with the input shaft 75 and this disc brake assembly includes a brake rotor 114 that is affixed to the shaft 75. A caliper pad assembly 115 is operated by a brake lever 116 which is coupled to the brake control lever 61 for brake operation.

It should be readily apparent from the foregoing description that an extremely compact highly effective transmission arrangement is provided for the compact golf cart and the construction permits the major components to lie within the triangle defined by the contact patch of the wheels with the ground so as to provide extremely good stability. In addition, the transmission mechanism provides a very simple and yet effective automatic transmission for insuring the proper speed ratios under all running conditions.

It is to be understood that the foregoing description is that of a preferred embodiment to the invention and various changes and modifications may be made without departing from the spirit and scope of the invention as defined by the appended claims.

We claim:

1. A powered cart comprising a frame assembly, a steerable front wheel assembly journaled at a forward portion of said frame assembly for steering of said cart, a pair of rear wheels journaled at opposite sides of the rear of said frame assembly, the contact of said front wheel assembly and said rear wheels with the ground defining generally a triangle, an internal combustion engine supported by said frame, means are provided for driving the rear wheels from said engine, and means are carried by said frame means for control of said cart by an operator standing adjacent to said cart including an upwardly and rearwardly extending member that lies at an angle to the horizontal and for steering of said cart, said engine lying within an area bounded by said triangle and having at least one cylinder extending at an angle to the horizontal generally parallel to the angle of said upstanding frame member.

2. A powered cart as set forth in claim 1, wherein the front wheel assembly is a caster wheel assembly for steering of the vehicle.

3. A powered cart as set forth in claim 1, further including a cowling member covering the engine and the means for driving the rear wheels, said engine being air cooled and said cowling member having an air inlet opening at one side of the cart and an air outlet opening at the other side of the cart.

4. A powered cart as set forth in claim 3, further including a fan driven by the engine and adjacent one of the air openings.

5. A powered cart as set forth in claim 4, wherein the fan is disposed adjacent the air inlet opening.

6. A powered cart as set froth in claim 1, wherein the means for driving the rear wheels comprises a variable belt transmission.

7. A powered cart as set forth in claim 6, wherein the variable belt transmission includes a centrifugal portion responsive to the speed of the engine for controlling the speed ratio between the engine and the rear wheels and a load responsive portion for lowering the transmission ratio when the load to drive the rear wheels exceeds a predetermined amount.

8. A powered cart as set forth in claim 7, wherein the variable belt transmission drives a combined reduction transmission and differential assembly.

9. A powered cart as set forth in claim 8, wherein the reduction transmission comprises a pair of planetary gear sets driven in series by an input shaft and wherein the rear wheels are driven by axles that lie below the input shaft.

10. A powered cart as set forth in claim 1, wherein a belt transmission drives a combined reduction transmission and differential assembly.

11. A powered cart as set forth in claim 10, wherein the reduction transmission comprises a pair of planetary gear sets driven in series by an input shaft and wherein the rear wheels are driven by axles that lie below the input shaft.

12. A powered cart comprising a frame assembly, a steerable front wheel assembly journaled at a forward portion of said frame assembly for steering of said cart, a pair of rear wheels journaled at opposite sides of the rear of said frame assembly, the contact of said front wheel assembly and said rear wheels with the ground defining generally a triangle, an engine supported by said frame, means are provided for driving the rear wheels from said engine, said means for driving said rear wheels comprising a variable belt transmission including a centrifugal portion responsive to the speed of the engine for controlling the speed ratio between the engine and the rear wheels and a load responsive portion for lowering the transmission ratio when the load for driving the rear wheels exceeds a predetermined amount and means are carried by said frame means for control of said cart by an operator standing adjacent to said cart, said engine lying within an area bounded by said triangle.

13. A powered cart as set forth in claim 12, wherein the belt transmission drives a combined reduction transmission and differential assembly.

14. A powered cart as set forth in claim 13, wherein the reduction transmission comprises a pair of planetary gear sets driven in series by an input shaft and wherein the rear wheels are driven by axles that lie below the output shaft.

* * * * *